United States Patent [19]

Kameo et al.

[11] Patent Number: 4,899,370
[45] Date of Patent: Feb. 6, 1990

[54] REMOTE CONTROL APPARATUS FOR ELECTRONIC EQUIPMENT

[75] Inventors: Akitaka Kameo; Isao Kozu, both of Katano, Japan

[73] Assignee: Matsushita Electric Industrial Co., Ltd., Osaka, Japan

[21] Appl. No.: 209,494

[22] Filed: Jun. 13, 1988

[30] Foreign Application Priority Data

Jun. 12, 1987 [JP] Japan ............................ 62-147596
Jun. 15, 1987 [JP] Japan ............................ 62-148566
Jun. 15, 1987 [JP] Japan ............................ 62-148572

[51] Int. Cl.⁴ ................. H04M 11/00; H04N 7/10; G06K 7/10
[52] U.S. Cl. ................................. 379/104; 379/105; 379/102; 379/442; 379/447; 235/375; 358/335; 358/194.1
[58] Field of Search ............... 379/102, 104, 105, 442, 379/443, 447; 358/194.1, 335; 235/375, 462, 472

[56] References Cited

U.S. PATENT DOCUMENTS

| | | | |
|---|---|---|---|
| 4,126,768 | 11/1978 | Grenzow | 379/357 |
| 4,465,926 | 8/1984 | Apitz et al. | 235/472 |
| 4,471,218 | 9/1984 | Culp | 235/262 |
| 4,475,153 | 10/1984 | Kihara et al. | 358/335 |
| 4,540,851 | 9/1985 | Hashimoto | 379/105 |

FOREIGN PATENT DOCUMENTS

| | | | |
|---|---|---|---|
| 1513664 | 3/1970 | Fed. Rep. of Germany . | |
| 3202949 | 9/1982 | Fed. Rep. of Germany . | |
| 3509965 | 9/1986 | Fed. Rep. of Germany . | |
| 2166322 | 4/1986 | United Kingdom | 379/102 |

OTHER PUBLICATIONS

"Automatische Anruf-beantworter in Fachgeschäft und Werkstatt," elektromarkt Nr. 11–Nov. 1971, pp. 10–12.
"Universal-Fernbedienungsgeber," Funkschau, Heft 17, 1979, pp. 48 and 50.

Primary Examiner—Jin F. Ng
Assistant Examiner—Wing Fu Chan
Attorney, Agent, or Firm—Spencer & Frank

[57] ABSTRACT

An apparatus for remotely controlling electronic equipment such as a VTR using a remote telephone set. The electronic equipment has a timer reservation unit which causes the electronic equipment to start a predetermined operation at a predetermined time in accordance with externally inputted reservation information and to become inoperable after a predetermined period. The timer reservation unit includes an input unit, and a remote controller is coupled to the input unit of the timer reservation unit to perform wireless communication therebetween. The remote controller is constructed such that the reservation information is transmitted to the input unit of the timer reservation unit in response to a predetermined push button operation or dial operation of the remote telephone set.

21 Claims, 9 Drawing Sheets

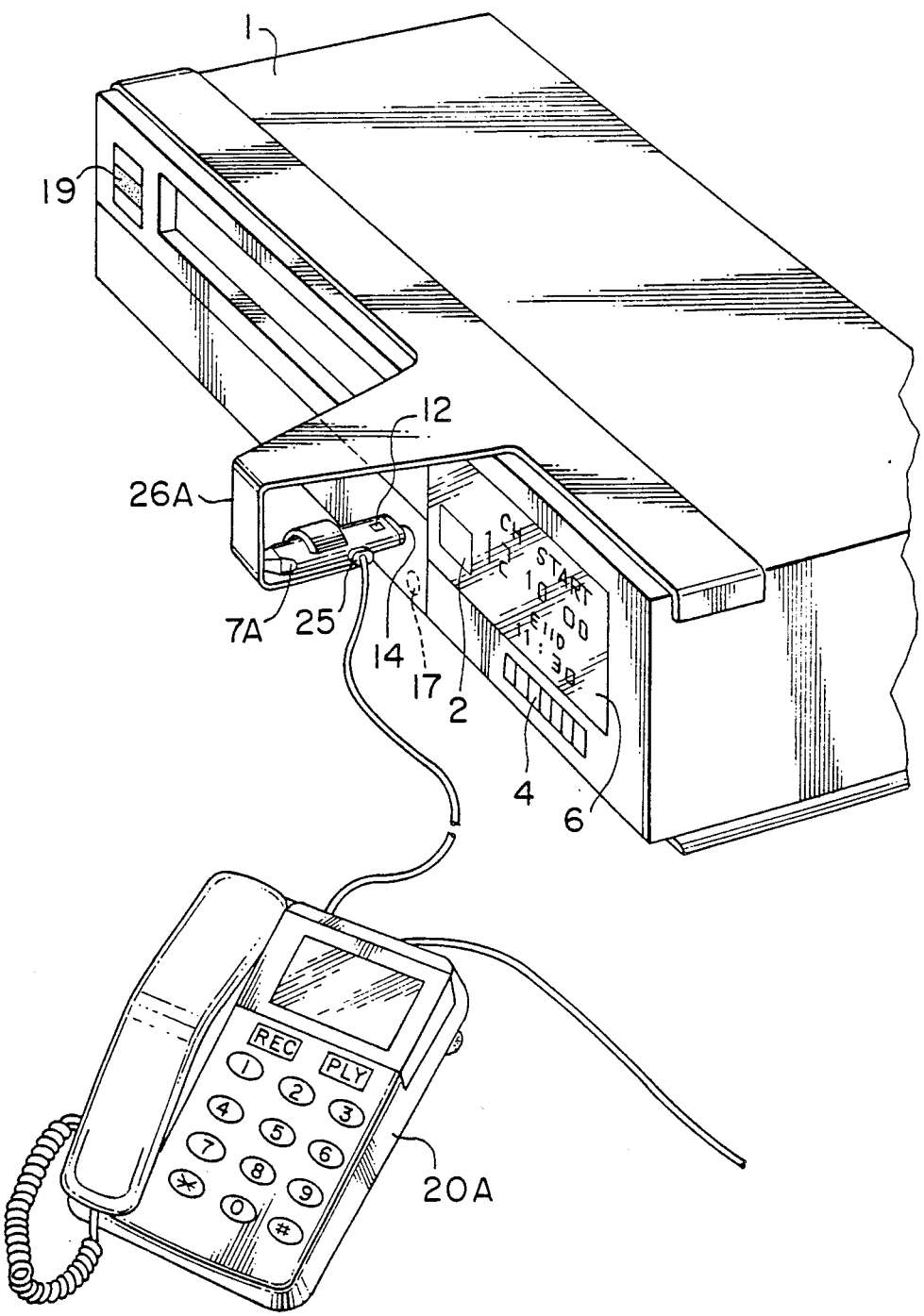

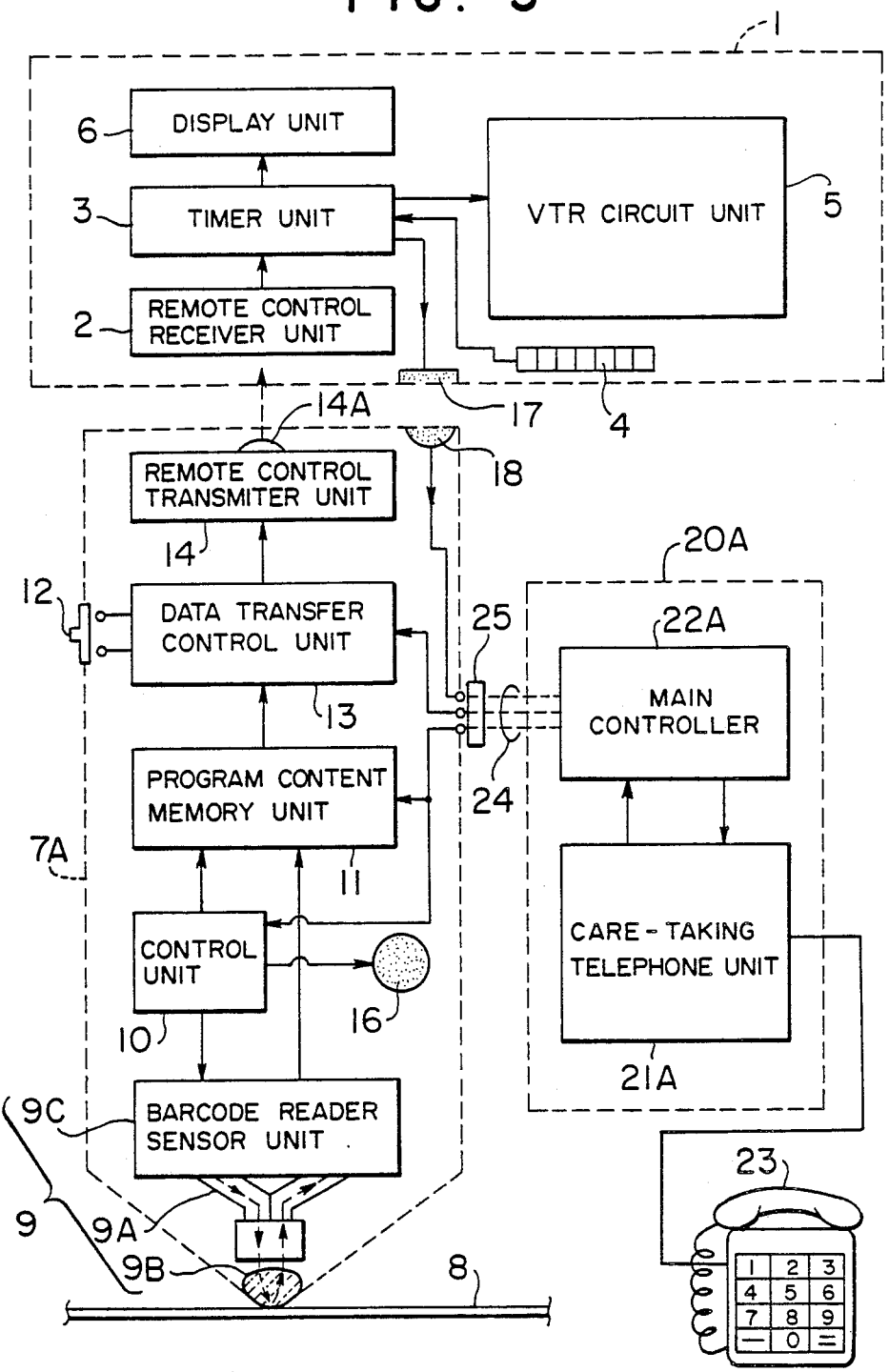

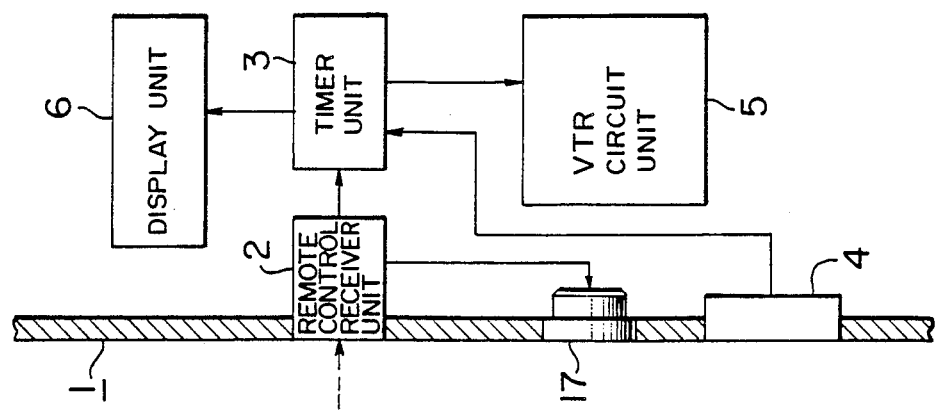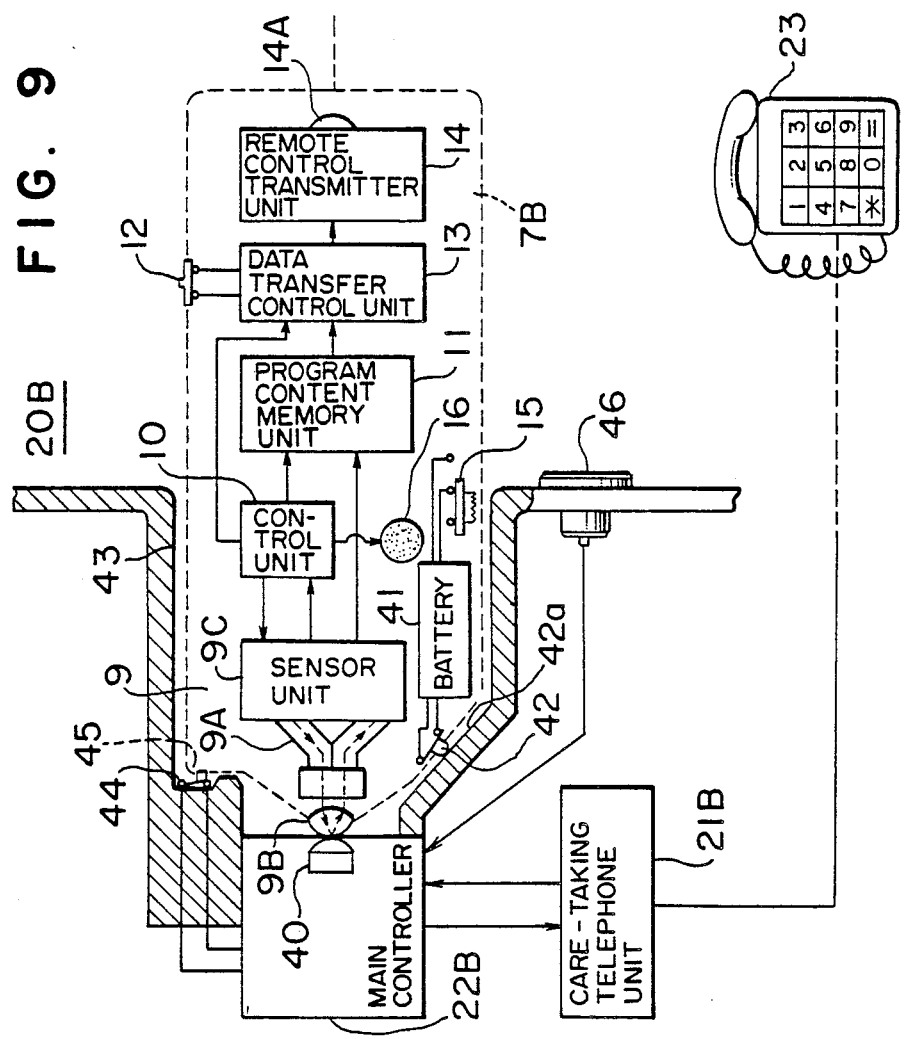
FIG. 9

REMOTE CONTROL APPARATUS FOR ELECTRONIC EQUIPMENT

BACKGROUND OF THE INVENTION

1. Field of the Invention

The present invention relates to a remote control apparatus for electronic equipment such as a video tape recorder having a timer reservation function of recording video images and/or audio sounds of a program, which remote control apparatus causes the electronic equipment to reserve a program by using a telephone line. Obviously the present invention is not limited only to a video tape recorder, but it is also applicable to an audio tape recorder, disk type recording/reproducing apparatus and the like.

2. Description of the Related Art

The following three systems for externally and remotely controlling a video tape recorder (hereinafter abbreviated as VTR) by using a telephone line are known in the art:

(1) A self-contained controller type wherein a VTR includes therein a controller which recognizes a command signal from an external telephone set to actuate the VTR to perform a desired timer recording reservation operation.

(2) A separate controller type wherein a controller of the type described above is provided separately from a VTR, and the controller and the VTR are connected by a cable or the like to communicate with each other.

(3) A remote controller type wherein a controller is provided separately from a VTR, and the controller is provided with a wireless remote control transmitter for activating the VTR to perform channel selection, recording and the like.

Since the above self-contained type (1) system uses a dedicated controller mounted within a VTR, it poses some problems. The VTR becomes bulky and is expensive for the user who does not want a remote reservation function using a telephone. Other problems also exist.

The above separate controller type (2) system and the remote controller type (3) system require that a dedicated timer be installed on the controller in order to preset the recording start time, recording end time and the like, so that they also pose some problems. The controllers are expensive and their structure becomes complicated, and other problems exist.

In addition, it is necessary to mount the remote controller of the type (3) system in front of the VTR such that the remote control signal transmitter unit (a wireless type using infrared light is widely used) can be directed toward a remote controller signal receiver unit mounted on the front panel of the VTR within a predetermined incident angle range (e.g., about 60 degrees). Conventionally, a remote controller has been installed in the following manner. According to a wall hanging type as shown in FIG. 1A, remote controller 50 is hung on a wall 52 in front of a VTR 51. The remote controller 50 is connected to a telephone set 55. Alternatively, according to an independent installation type as shown in FIG. 1B, a remote controller 54 is installed on a frame 53, a table, or the like disposed in front of a VTR 51. The remote controller 54 is connected to a telephone set 56.

However, use of the remote controller 50 of a wall hanging type shown in FIG. 1A is considerably limited if there is a cabinet or the like at the wall 52 in front of the VTR 51 or if a mounting jig such as a nail cannot be fixed on the wall 52. Further, there is the problem that if someone crosses the path between the remote controller 50 and the VTR 51 during a remote control operation by the telephone set 55, a remote control signal from the remote controller 50 to the VTR 51 is temporarily intercepted and a correct remote control operation is impossible.

Also, in the independent installation type shown in FIG. 1B, it is necessary to place an additional table, frame 53 or the like in front of the VTR 51 for supporting the remote controller 54 thereon. This additional table, frame 53, or the like may become an obstacle for someone walking nearby. Furthermore, the remote controller 54 may be moved, while one's pet such a dog or cat plays with it, to such an extent that the VTR 51 cannot be operated by the remote controller 54.

A common problem associated with both the types shown in FIGS. 1A and 1B is that since the placement of the VTR 51, especially the height from the floor or a rug, may vary for each user or household, the remote controller 50 or 54 must be adjusted so as to match each user's particular placement, thus leaving a cumbersome burden on the user.

SUMMARY OF THE INVENTION

It is an object of the present invention to provide a remote control apparatus for electronic equipment which is capable of performing a remote timer reservation operation by positively using a timer reservation unit of the electronic equipment having the timer reservation function, and without specially modifying the electronic equipment itself and without adding a dedicated timer unit to a remote controller side.

It is another object of the present invention to provide a remote control apparatus for electronic equipment wherein a remote controller can be readily directed toward the electronic equipment to be controlled, with a desired and reliable mutual positional relationship.

It is a further object of the present invention to provide a remote control apparatus for equipment wherein a remote controller need not necessarily to be connected by a cable to a telephone set installed in a house.

The above and other objects and features of the invention will appear in the following description and appended claims, reference being made to the accompanying drawings forming a part of this specification wherein like reference characters designate corresponding parts in the several views.

BRIEF DESCRIPTION OF THE DRAWINGS

FIG. 2 is a perspective view showing the main part of an embodiment of the present invention;

FIG. 3 is a block diagram of the embodiment of FIG. 2;

FIG. 9 is a block diagram of the embodiment of FIG. 7; and

DESCRIPTION OF THE PREFERRED EMBODIMENTS

Figure 1A:
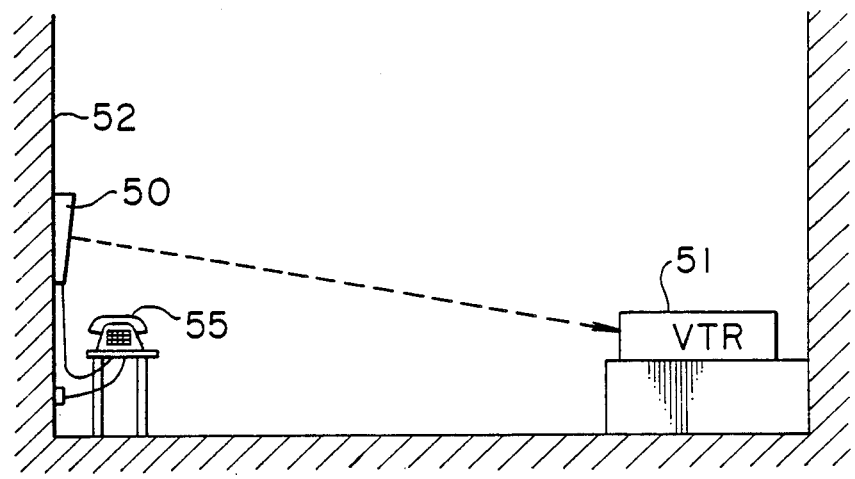
FIGS. 1A and 1B are schematic diagrams used for explaining the prior art technique.
Figure 1B:
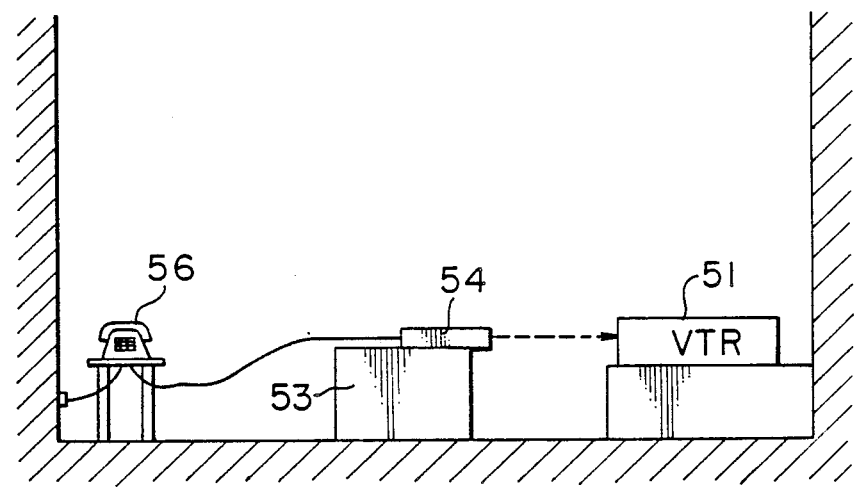
Figure 4:
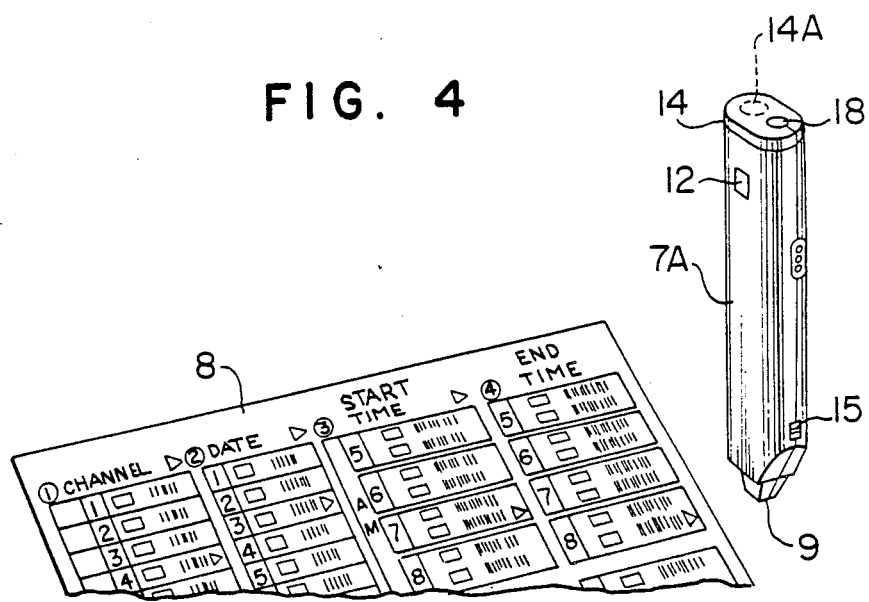
FIG. 4 is a perspective view showing an example of using the bar code reader shown in the embodiment of FIG. 2.
Figure 5:
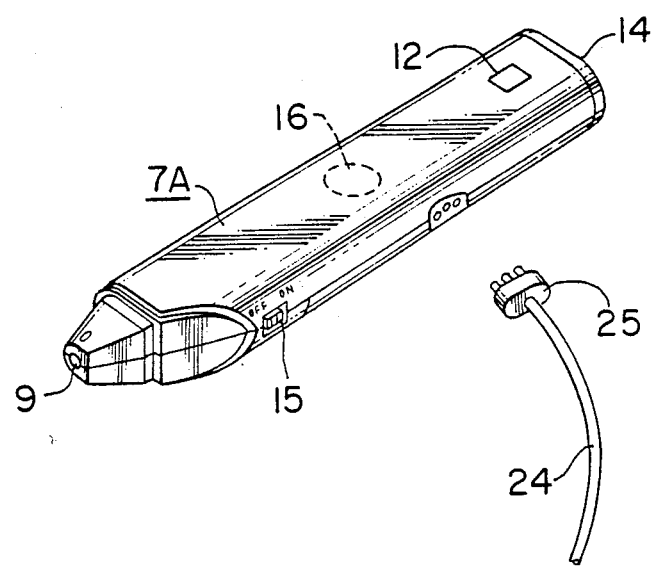
FIG. 5 is a perspective view showing the bar code reader and its connector.

The present invention will further be described in connection with the embodiments shown in the accompanying drawings. The embodiments use a VTR by way of example as electronic equipment that is to be controlled. FIG. 2 is a perspective view showing the major features of an embodiment and illustrating an example of how the present invention is practiced, and FIG. 3 is a block diagram showing the major circuit elements of the example. Referring to FIGS. 2 and 3, a VTR 1 has a function of performing a timer reservation recording of a television broadcasting program by means of the wireless remote control method using infrared rays. Reference numeral 2 denotes a remote control receiver unit. In response to the data inputted from the remote control receiver unit 2 or a program timer reservation operation unit 4 mounted on the VTR 1, a timer unit 3 outputs a command such as a recording start command, a recording end or the like to a VTR circuit unit 5 when it becomes a set (reserved) time. The desired television broadcasting channel, recording start day and time, recording end day and time, and the like for reservation purposes are displayed on a display unit 6 made of a fluorescent lamp or a liquid crystal panel in accordance with the data inputted from the remote control receiver unit 2 or the program timer reservation operation unit 4. The timer reservation apparatus, including the remote control receiver unit 2, timer unit 3 and display unit 6, is always powered on even if the main power switch 19 of the VTR 1 is not turned on, so that it is activated immediately when predetermined input information is supplied to the remote control receiver unit 2. A bar code reader 7A functioning as a remote controller selectively reads program information for a desired program from a program sheet 8 (refer to FIG. 3 and FIG. 4), on which are printed various bar coded program information data such as a television broadcasting channel, date, recording start time, recording end time and the like. The bar code reader 7A wireless-transmits the read-out information to the remote control receiver unit 2 of the VTR 1 to thereby perform a timer recording reservation for the VTR 1. The bar code reader 7A, as shown by the block diagram of FIG. 3 and by the perspective view of FIGS. 4 and 5, is of a pen-type which can be gripped by hand, and is provided at its tip with an optical bar code reading sensor unit 9C constituting an optical information input unit 9, the sensor unit 9C including various optical elements such as a light emitting element, light receiving element, optical fiber 9A and lens 9B for guiding light, and the like. The information input unit 9 operates to read the program reservation information in response to a control command from a control unit 10, and the read-out information is sequentially stored in a program content memory unit 11 which is controlled also by the control unit 10. The stored program recording reservation information, such as "channel", "date", "start time" and "end time," is transferred to a remote control transmitter unit 14 via a data transfer control unit 13 when a transfer switch 12, is turned on and is transmitted outside from a remote control transmission element 14A such as an infrared light emitting diode of the remote control transmitter unit 14. Consequently, if a user wants to input the program reservation content read out using the bar code reader 7A and the program sheet 8 to the VTR 1, the user merely pushes the transfer switch 12 while directing the back end of the bar code reader 7A (where the remote control transmission element 14A of the remote control transmitter unit 14 is mounted) toward the remote control receiver unit 2 of the VTR 1. The program reservation information inputted to the remote control receiver unit 2 of the VTR 1 can be confirmed by observing the display 6 on which the information is being displayed for a predetermined time (e.g., 12 seconds).

The bar code reader 7A is powered by a dry battery (not shown). The switch of the dry battery is shown in FIG. 5 by reference numeral 15. As the bar code reader 7A is sequentially scanned in the direction shown by the arrows in FIG. 4 to read the program reservation information, a sound generator 16 shown in FIG. 3 generates a single audible confirmation sound "Pih" each time a correct and proper reading is performed, and generates a consecutive audible confirmation sound "Pi, Pi, Pi, Pi, Piii" when the final reading is completed. A light emitting element such as a light emitting diode may be used in combination with the sound generator to provide confirmation of a bar code reading operation visually as well as audibly.

A sound generator 17 on the side of the VTR 1 also generates an audible confirmation sound when the input of the reservation information to the timer unit 3 is completed. It is preferable to make the sound of the sound generator 16 of the bar code reader 7A distinguishable from the sound of the sound generator 17, by using at least one of a different pronunciation and a sound tone, e.g., "Pih, Pih, Pih, Pih, Piii".

A microphone 18 is provided in the bar code reader 7A to serve as a transmission means for picking up an audible sound from the sound generator 16 or 17 and transmitting the picked-up sound as a confirmation signal to a user (a calling party) of a remote telephone set. The operation of the transmission means will be described later.

The reservation operation has been described in the foregoing description, wherein a desired television broadcasting program can be timer-recorded on a desired day and time by using the bar code reader 7A and the program sheet 8. According to the embodiments of this invention, the timer recording reservation operation can be made by the remote telephone set using the bar code reader as a part of the remote controller. The detailed description for this will now be presented. A care-taking telephone set 20A shown in FIGS. 2 and 3 is a known type having a function of recording audio messages from a calling party. The care-taking telephone set 20A has a main controller 22A as well as a care-taking telephone unit 21A as shown in FIG. 3. When the remote telephone set 23 has established a connection to the care-taking telephone set 20A and supplied a specific user code thereto, the main controller 22A is connected to the remote telephone set 23 via the care-taking telephone unit 21, and thereafter it outputs code signals corresponding to push buttons "1", "2", . . . , "9", "0", "*" and "#" in response to pushing the buttons (or dialing) of the remote telephone set 23. For instance, by pushing the buttons of the remote telephone set 23 in the order of "#", "4", "#", "3", "#", "7", "*", "3", "*", "0", "#", "8", "*", "3", "*" and "0", the main controller 22A outputs code signals that are the same as the bar code information corresponding to "channel 4", "3rd day", "7:30", and "8:30" which can be obtained by sequentially scanning the bar code reader 7A from the left to the right in the direction indicated by the arrows in FIG. 4. Accordingly, by connecting the main controller 22A via a cord 24 and a connector 25 to the control unit 10, program content memory unit 11 and data transfer control unit 13 respectively of the bar code reader 7A, it becomes possible to transmit the timer recording reservation information from the remote control transmitter unit 14 in response to the remote control at the remote telephone set 23. In this case, each time a push button of the remote telephone set 23 is activated, an audible confirmation sound "Pih" is generated by the sound generator 16 of the bar code reader 7A, which audible confirmation sound is picked up by the microphone 18 and sent back as a confirmation signal to the user (calling party) of the remote telephone set 23 via the connector 25, cord 24, main controller 22A and care-taking telephone unit 21A.

After completion of the reservation operation by the remote telephone set 23, a data transfer pulse is sent from the main controller 22A to the data transfer control unit 13. This data transfer pulse is equivalent to turning on the transfer switch 12, so that the program reservation information stored in the program content memory unit 11 is transmitted from the remote control transmission element 14A of the remote control transmitter unit 14 and applied to the remote control receiver unit 2 of the VTR 1, to thereby perform the timer reservation of the VTR in a manner similar to that described above. In this case, the consecutive audible confirmation sound "Pi, Pi, Pi, Pi, Piii" to be emitted from the sound generator 16 at the end of the reservation operation by the remote telephone set 23, and the consecutive audible confirmation sound "Pih, Pih, Pih, Pih, Piii" to be emitted from the sound generator 17 at the end of the timer reservation by the VTR 1, are both picked up by the microphone 18 installed at the bar code reader 7A. These signals are sent back as confirmation signals to the user (calling party) of the remote telephone set 23 via the connector 25, cord 24, main controller 22A and care-taking telephone unit 21A.

An example of holding means for holding the remote controller (bar code reader) is shown in FIG. 2 at reference number 26A. The holding means is useful when the bar code reader 7A is used for the remote timer reservation by the remote telephone set. Particularly, the holding means 26A is constructed such that the bar code reader 7A can be detachably mounted on the VTR 1, with the remote control transmitter unit 14 being directed toward the remote control receiver unit 2 of the VTR 1. A predetermined clearance is maintained between 14 and VTR 1.

Figure 6:
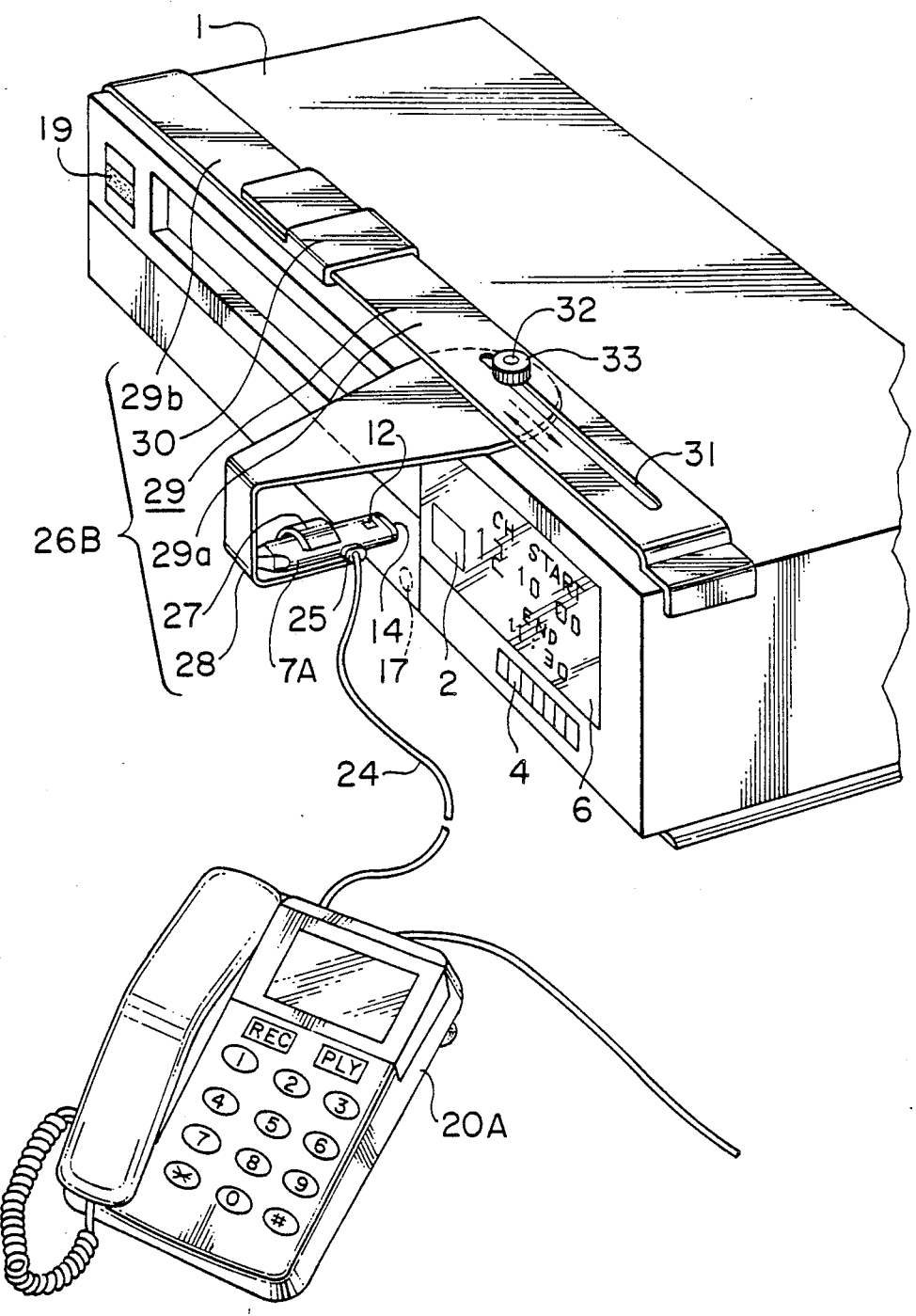
FIG. 6 is a perspective view showing another embodiment of the invention.

FIG. 6 is a perspective view showing another example of the holding means for the remote controller, together with a VTR. In FIG. 6, identical reference numerals have been used to designate similar components and units as of FIG. 2. A holding means 26B for the remote controller shown in FIG. 6 comprises a first member 28 and a second member 29. The first member 28 has a cantilever structure is constructed such that the bar code reade 7A can be detachably held in position by a support piece 27 while maintaining the remote control transmitter unit 14 directed toward the remote control receiver unit 2 of the VTR 1. The second member 29 holds the first member 28 in position so that the bar code reader 7A supported by the first member 28 faces the remote control receiver unit 2 of the VTR with a predetermined clearance therebetween.

The second member 29 comprises a first support member 29a, second support member 29b, and coupling means 30. The first support member 29a has a strip shape and is constructed to be capable of being hung on the right side edge of the upper frame of the VTR 1. The second support member 29b is also of a strip type, and is constructed t be capable of being hung on the left side edge of the upper frame of the VTR 1. The coupling means 30 couples the first and second support members 29a and 29b by slidably superposing parts of them to change the effective length of the second member 29. With this arrangement, the second member 29 can be mounted on various types of VTRs of the same or different makers even if the VTRs have widths that differ from the width of VTR 1.

An elongated slot 31 is formed in the second support member 29a for guiding a pin member 32 such as a screw therealong, the pin member being mounted on the base portion of the first member 28. A squeeze member 33 such as a nut is provided for engagement with the pin member. When the squeeze member 33 is loosened, the first member 28 can be moved freely along the elongated slot 31 in the lateral direction of the second member 29. Alternatively, when the squeeze member 23 is tightened, the first member 28 can be fixedly connected to the second member 29. The reason for using such an arrangement is to permit the first member 28 to correctly face the remote control receiver unit 2 even if the location thereof varies with the type and make of the VTR. Further, since the first member 28 is rotatable with respect to the second member 29, they can be pivoted so that the space for the first and second members 28 and 29 when not in use (during storage) becomes small. In addition, the incident angle of the remote control signal emitted from the bar code reader 7A can be changed in the horizontal plane with respect to the remote control receiver unit 2 so that the bar code reader 7A can be set at an optimum location where radiated energy for remote control can be most efficiently received. The bar code reader 7A (remote controller) may be so arranged as to be movable in the vertical direction if necessary.

As will be appreciated from the foregoing description, the bar code reader 7A or the remote controller can be held in position to correctly face the electronic equipment to be controlled, or the VTR 1 in the above embodiment, by detachably mounting the holding means 26A or 26B for holding the remote controller. Therefore, even if the placement of the electronic equipment, especially the installation height from the floor or rug, changes for each user, no problem arises. There is no restriction against the installation location of the remote controller. Also, erroneous operation does not occur due to the careless presence of someone or one's pet between the remote controller and the electronic equipment to be controlled. Also, an additional table or frame for mounting the remote controller thereon is not needed, so that no obstacle is presented to someone walking nearby. The direction of the remote controller toward the electronic equipment to be controlled is not susceptible to careless changes, so that a stable remote control procedure can always be maintained once the installation is finished.

As shown in the above embodiment, the space for storing the holidng means can be minimized if the first member 28 and the second member 29 are pivoted together by rotating one about the other. Also, the angle of the remote controller relative to the electronic equipment to be controlled can be changed in the horizontal plane so that the remote controller can advantageously be set at the position where the radiated energy for remote control can be received most efficiently.

Further, since the first member 28 is movable relative to the second member 29 along the elongated guide slot 31, the holding means can be applied to different types and makes of electronic control equipment, regardless of the position of the remote control receiver unit 2. Furthermore, the second member 29 is constructed such that the first support member 29a is capable of being hung on the left side edge of the upper frame of the electronic equipment to be controlled and the second support member 29b is capable of being hung on the right side edge of the frame, with the support members 29a and 29b being slidably superposed at portions thereof to permit the effective length of the second member 29 to be changed. Therefore, even if the width of the electronic equipment to be controlled varies with the type of make thereof, the second member 29 can be mounted on any electronic equipment.

Next, a further embodiment of this invention will be described with reference to FIGS. 7 to 10. This embodiment is the same as the embodiments shown in FIGS. 2 and 6 in that electronic equipment to be controlled or a VTR is remotely controlled by a wireless type bar code reader (remote controller) for the timer recording reservation. However, quite a different feature from the above embodiments is that a bar code reader is detachably mounted on a private telephone set itself. With the bar code reader mounted on the private telephone set (refer to FIGS. 7 to 9), control command information can be supplied to the bar code reader from a remote telephone set and the private telephone set to thus perform a timer recording reservation. To this end, in the present embodiment, a care-taking telephone set 20B has, besides a care-taking telephone unit 21B, a main controller 22B with signal coupling means 40 which will be described in detail later.

Referring to FIG. 9, a bar code reader 7B is powered by a built-in battery 41 whose power supply circuit is caused to be turned on or off by a slide-type power switch 15 mounted on the side of the main frame of the bar code reader. Another power switch 42 of the pushbutton type is also mounted on the rear side of the main frame near the tip of the bar code reader 7B, which power switch makes the power supply circuit of the battery 41 turn on only when the bar code reader 7B is pushed into the main frame. The operation of the power switch 42 will further be described later.

An inlet opening 43 is formed at the back of the care-taking telephone set 20B to detachably receive one end of the bar code reader 7B (the end having an information input section 9) and hold it in position. A signal coupling means 40 is provided inside of the inlet opening 43. The signal coupling means 40 is coupled (optically in this embodiment) to communicate with the information input section 9 when the bar code reader 7B is inserted into opening 43. The signal coupling means comprises a light emitting element and a light receiving element which transfer control commands from the remote telephone set 23 to the bar code reader 7B via the care-taking telephone unit 21B and the main controller 22B.

When the external telephone set 23 has established a connection to the care-taking telephone set 20B and supplied a specific user code thereto, the main controller 22B is connected to the remote telephone set 23 via the care-taking telephone unti 21B. Thereafter code signals corresponding to push buttons "1", "2", ..., "9", "0", "*", "#" are supplied to the signal coupling means 40 in response to pushing a button (or dialing) of the remote telephone set 23.

Figure 7:
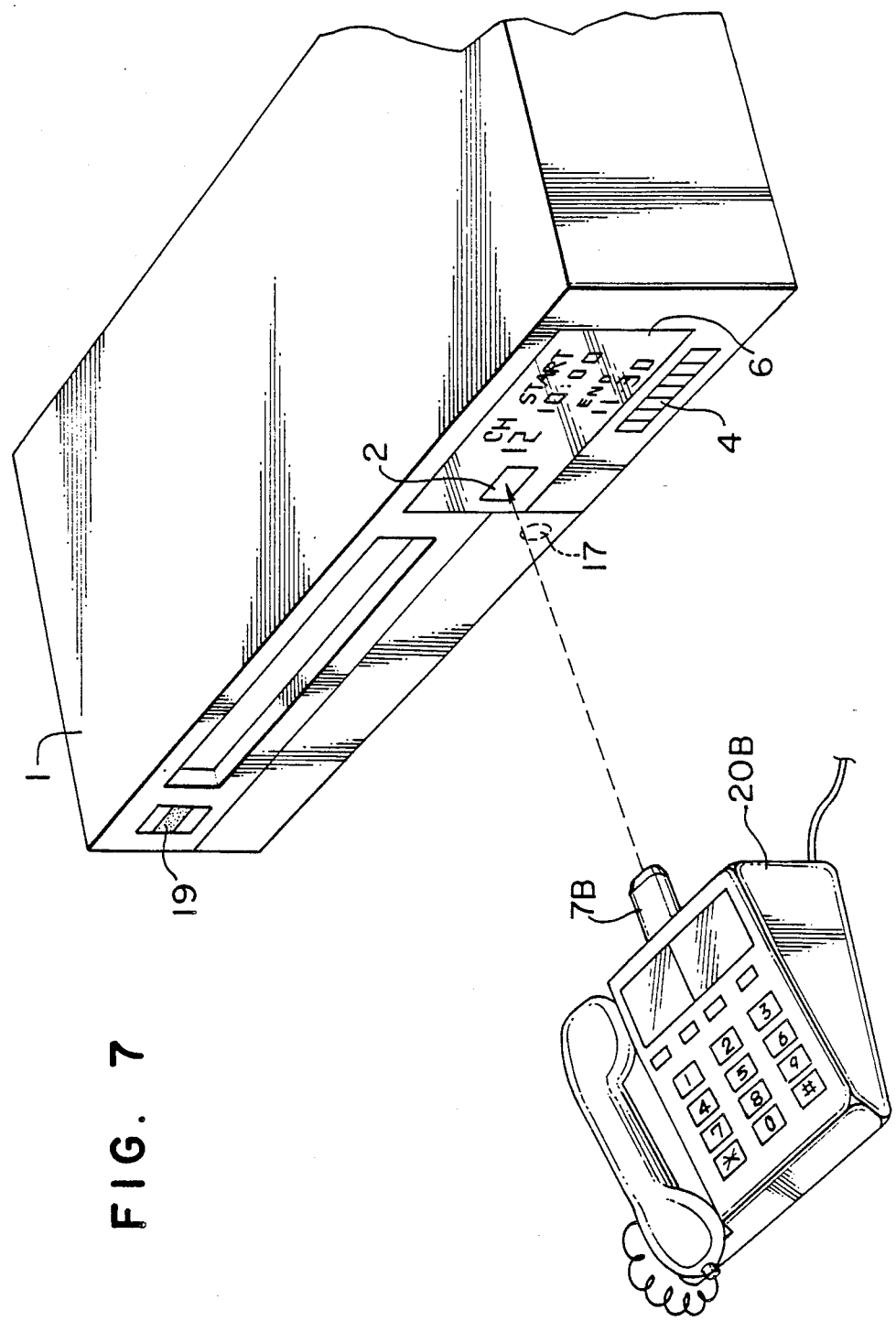
FIG. 7 is a perspective view showing the main part of still another embodiment of the invention.
Figure 8:
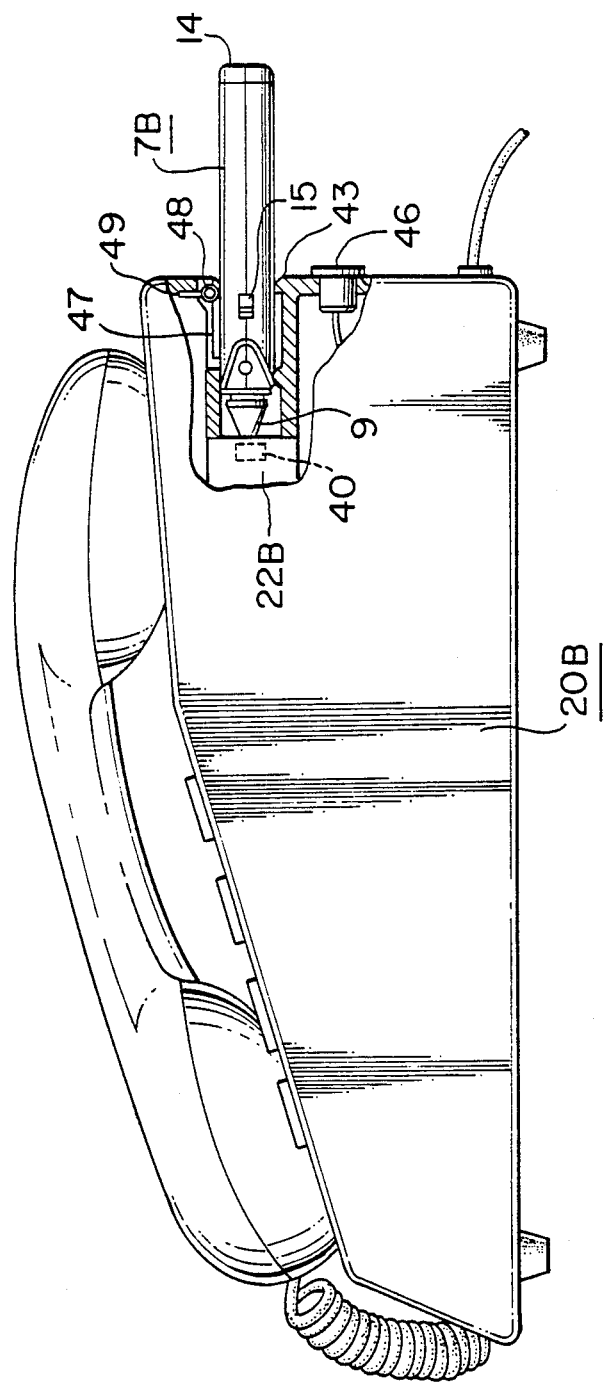
FIG. 8 is a side view, broken away in part, of the telephone set and a remote controller in the embodiment of FIG. 7.
Figure 10:
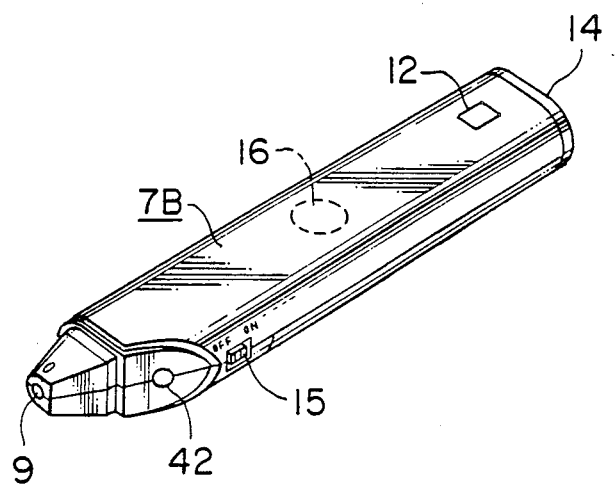
FIG. 10 is a perspective view of the remote controller used in the embodiment shown in FIG. 7.

When the bar code reader 7B is held in position at the inlet opening 43 of the care-taking telephone set 20B as shown in FIGS. 7 to 9, the bar code reader 7B becomes operable since the power switch opening 42 is pushed by a part 42a of the inlet opening 43 and turned on. The main controller 22B also becomes operable since the power switch 44, which is mounted at the end portion of the inlet opening 43, is pushed by a part 45 of the bar code reader 7B and turned on. In this condition, a code signal from the main controller 22B is converted into an optical signal (information) by the signal coupling means 40. The optical signal is read by the information input section 9 of the bar code reader 7B in a manner similar to that described above with regard to reading the program information from the program sheet 8, and the information is stored in the program content memory unit 11.

When a button pushing operation corresponding to "reservation completion" is performed using the remote telephone set 23, a corresponding code signal is outputted from the main controller 22B. This iode signal is sent to the control unit 10 via the signal coupling means 40 and information input section 9. The data transfer control unit 13 is activated, just as if the transfer switch 12 had been turned on, so that the data stored in the program content memory unit 11 are transferred to the remote control transmitter unit 14 to be transmitted as an infrared remote control signal to the remote control receiver unit 2 of the VTR 1.

In the manner described above, the timer recording reservation information can be transmitted from the remote control transmitter unit 14 of the bar code reader 7B in accordance with the remote control operations at the remote telephone set 23. In this case, an audible confirmation sound "Pih" is generated by the sound generator 16 mounted within the bar code reader 7B each time a button of the remote telephone set 23 is depressed. The audible confirmation sound is picked up by a microphone 46 mounted on the care-taking telephone set 20B and sent back as a confirmation signal to the user (calling party) of the remote telephone set 23 via the main controller 22B and the care-taking telephone unti 21B.

After completion of the reservation operation by the remote telephone set 23, a consecutive audible confirmation sound "Pi, Pi, Pi, Pi, Piii" is emitted from the sound generator 16 mounted within the bar code reader 7B. Also, after completion of the timer reservation of the VTR 1 in response to the remote control signal from the bar code reader 7B, a consecutive audible confirmation sound "Pih, Pih, Pih, Pih, Piii" is emitted from sound generator 17 mounted on the VTR 1. Both sounds are picked up by the microphone 46 and transferred as a confirmation signal to the user of the remote telephone set 23. The microphone 46 and the circuitry for transferring the confirmation signal to the external telephone set 23 constitute confirmation means.

As is shown in FIG. 8, at the front of the inlet opening 43 of the care-taking telephone set 20B, a cover member 47 constituting an open/close means for opening and closing the inlet opening 43 is mounted to prevent dust or the like from being introduced within the inlet opening 43. The cover member 47 is pivoted at a pivot shaft 48 and is rotatable between an open position and a close position. The cover member 47 is always energized by a resilient member 49 such as a twist spring to urge it to always take the closed position. Consequently, when the bar code reader 7B is not inserted into the inlet opening 43, the cover member 47 is maintained closed. On the other hand, as the information input section 9 of the bar code reader 7B is gradually inserted into the inlet opening 43, the cover member 47 is pushed against the spring force of the resilient member 49 and rotated to take its open position as shown in FIG. 8. It is needless to say that if the bar code reader 7B is pulled out from the inlet opening 43, the cover member 47 recovers its original closed position with the aid of the resilient member 49.

In the embodiment shown in the Figures, when the bar code reader 7B is inserted into the inlet opening 43 so as to be held in position, the power switches 42 and 44 and turned on to automatically make the bar code reader 7B and the main controller 22B operative. In view of this, the bar code reader 7B and the inlet opening 43 have shapes asymmetrical to each other as shown in FIG. 9, and the locations of the power switches 42 and 44 are properly set. It is obvious that other modifications may be made. Namely, a suitable marking may be added to the bar code reader 7B and the inlet opening 43 to prevent the former from being inserted into the latter in the wrong direction. Alternatively, special configurations of the bar code reader 7B main frame and the inlet opening 43 may be used to allow the former to be insertable into the latter only in a predetermined direction.

As will be apparent from the foregoing description, according to the remote control apparatus for the electonic equipment illustrated by the example shown in FIGS. 7 to 10, the bar code reader or the remote controller is inserted into the inlet opening of a telephone set such that the transmitter unit is disposed to correctly or approximately face the remote control receiver unit of the electronic equipment to be controlled, such as a VTR. This allows remote controlling of the electronic equipment by the telephone set. Therefore, such an operation can be done readily by everyone. Further, no additional cord for wiring is required, so that the appearance of the room is not degraded in any way.

Further, as was described with respect to the above embodiment, the inlet opening of the telephone set is arranged to be opened or closed, so that malfunctions or improper operation due to introduction of dust or the like can be effectively avoided. Furthermore, if at least one of the power supply circuits of the remote controller and the main controller within the telephone is arranged to be actuated only when the remote controller is inserted into the inlet opening of the telephone set at a predetermined position, the operating feasibility is further improved in addition to the power conservation effect. Still further, when the push buttons or dial of the remote telephone set is operated, an audible confirmation sound is generated from the remote controller and the electronic equipment and the sound is picked up to be sent back as a confirmation signal to the user (calling party) of the remote telephone set. Therefore, operations such as the timer recording reservation by the remote telephone set can be more reliably performed.

It will be further understood by those skilled in the art that the foregoing description is made as the preferred embodiments of the disclosed invention and that various changes and modifications may be made according to the invention without departing from the spirit and scope thereof.

What we claim is:

1. A remote control apparatus for controlling electronic equipment using a local telephone set and a remote telephone set, said electronic equipment having a housing and having a timer reservation unit which includes a wireless communication input unit in said housing, said timer reservation unit causing the electronic equipment to start and stop a predetermined operation at respective predetermined times in accordance with reservation information received via said input unit, said remote control apparatus comprising: a remote controller to perform wireless communication with said input unit of said timer reservation unit, said remote controller additionally being coupled to a main controller of said local telephone set, and said remote controller further including means for transmitting said reservation information to said input unit of said timer reservation unit in response to predetermined push button or dial operations of said remote telephone set, received via said main controller of said local telephone set, said means for transmitting including a remote control signal transmitter unit; and holding means for holding said remote controller so as to maintain a predetermined mutual positional relationship between said remote controller and said electronic equipment, said holding means including
   a first member capable of detachably holding said remote controller, and
   a second member detachably mounted on said housing of said electronic equipment for supporting said first member such that said remote control signal transmitter unit of said remote controller faces said input unit of said electronic equipment with a predetermined clearance therebetween.

2. A remote control apparatus for controlling electronic equipment using a local telephone set and a remote telephone set, said electronic equipment having a housing and having a timer reservation unit which includes a wireless communication input unit in said housing, said timer reservation unit causing the electronic equipment to start and stop a predetermined operation at respective times in accordance with reservation information received via the input unit, said remote control apparatus comprising:
   a remote controller means, which is coupled to a main controller of said local telephone set, said remote controller means being additionally coupled wirelessly to said input unit of said timer reservation unit, for transmitting said reservation information to said input unit of said timer reservation unit in response to predetermined push button or dial operations of said remote telephone set received via said main controller of said local telephone set,
   wherein said remote controller means is provided at a first end portion thereof with an information input section means for receiving said reservation information from said local telephone set and at a second end portion thereof with a transmitter unit means for wirelessly transmitting said reservation information to said input unit of said timer reservation unit; and wherein said local telephone set is formed with an inlet opening for detachably receiving therein said first end portion of said remote controller means to hold said remote controller means at a predetermined position, and wherein said local telephone set includes signal coupling means mounted inside of said inlet opening for coupling to said information input section means when said remote controller means is inserted into said inlet opening at said predetermined position to communicate therewith and transfer said reservation information from said local telephone set to said remote controller means.

3. A remote control apparatus for electronic equipment having a timer reservation unit which causes the electronic equipment to effect a given operation at a given schedule in accordance with remotely-inputted reservation information, said apparatus comprising:

a bar code reader of the hand-held type, said bar code reader including reader means for optically reading bar-coded data representing information relating to timer reservation for operation of said electronic equipment and converting said data into an electrical signal, storing means for storing said converted electrical signal, and transmitting means for transmitting said stored electrical signal towards said timer reservation unit via wireless communication so that said electrical signal is inputted into said timer reservation unit as the reservation information;

holding means for detachably mounting said bar code reader to said electrical equipment so as to hold said bar code reader at a position where said transmitting means faces said timer reservation unit with a predetermined space therebetween; and telephone means for supplying to said bar code reader a remote control signal to be wirelessly transmitted toward said timer reservation unit as said reservation information, said telephone means including a local telephone unit to receive telephone communication transmitted from a remote telephone set, said telephone means additionally including a main controller connected to said local telephone unit and said bar code reader, said main controller being responsive to a specifically coded signal included in the telephone communication received by said local telephone unit and converting said specifically coded signal into said remote control signal which is supplied to said bar code reader.

4. A remote control apparatus according to claim 3, wherein said electronic equipment includes a remote control signal receiver unit, and wherein said holding means comprising:

a first member to detachably hold said bar code reader; and a second member to be detachably mounted on said electronic equipment, said second member supporting said first member so that said transmitting means of bar code reader detachably held by said first member faces said remote control signal receiver unit of said electronic equipment with a predetemined clearance therebetween.

5. A remote control apparatus according to claim 4, wherein said electronic equipment has a frame with an upper portion, wherein said first member is pivotally supported by said second member and can be pivoted with respect to said second member, and wherein said second member is configured to be mounted on the upper portion of said frame of said electronic equipment.

6. A remote control apparatus according to claim 5, wherein the upper portion of said frame of said electronic equipment has left and right side edges, and wherein said second member comprises:

a first support member to engage said right side edge of said upper portion of said frame of said electronic equipment;

a second support member to engage said left side edge of said upper portion of said frame of said electronic equipment; and coupling means for changing the effective length of said second member by slidably superposing parts of said first and second support members.

7. A remote control apparatus according to claim 4, wherein said second member is formed with an elongated slot, and wherein said holding means further comprises a bolt member to be inserted in said elongated slot and movable therealong, and a nut member which is attached to said bolt member to couple said first member and said second member.

8. A remote control apparatus according to claim 3, wherein said bar code reader optically reads and temporarily stores bar coded program information including at least a predetermined television broadcasting channel, recording date, recording start time and recording end time, and transmits said stored data as a remote control signal to said timer reservation unit in the form of infrared rays; and wherein said electronic equipment is a video tape recorder with a timer reservation unit which causes said video tape recorder to start a recording operation at a given date and time in response to said remote control signal from said bar code reader and to stop said recording operation after a given time.

9. A remote control apparatus for electronic equipment having a timer reservation unit which causes the electronic equipment to effect a given operation at a given schedule in accordance with remotely inputted reservation information, said apparatus comprising:

a bar code reader of the hand-held type, said bar code reader including reader means for optically reading bar-coded data representing information relating to timer reservation for operation of said electronic equipment and converting said data into an electrical signal, storing means for storing said converted electrical signal, and transmitting means for transmitting said stored electrical signal towards said timer reservation unit via wireless communication so that said electrical signal is inputted into said timer reservation unit as the reservation information; and a local telephone unit having a housing with an inlet opening for detachably receiving one end portion of said bar code reader therein to hold said bar code reader at a predetermined position, said local telephone unit including a main controller having signal coupling means which is mounted adjacent to said inlet opening for optically coupling to said reader means when said bar code reader is inserted into said inlet opening at said predetermined position, said main controller responding to push button operations or dial operations of a remote telephone set thereby to operate said bar code reader so as to produce the reservation information for said timer reservation unit.

10. A remote control apparatus according to claim 9, wherein said local telephone unit further comprises open/close means for opening and closing said inlet opening of said housing, said open/close means being mounted adjacent said inlet opening and including a cover member pivotal between a closed position and an open position, and a resilient member for urging said cover member toward said closed position, said cover member being rotated against the resilient force of said resilient member from said closed position to said open position as said bar code reader is inserted into said inlet opening and said one end portion of said bar code reader pushes said cover member.

11. A remote control apparatus according to claim 10, wherein said bar code reader further comprises a power supply circuit, and a power switch which is pushed by a part of said housing and turns on said power supply circuit only when said bar code reader is inserted into said inlet opening at said predetermined position.

12. A remote control apparatus according to claim 10, wherein said main controller has a power supply circuit, and wherein said local telephone unit comprises a power switch which turns on said power supply circuit of said main controller only when said bar code reader is inserted into said inlet opening at said predetermined position.

13. A remote control apparatus for an electronic equipment according to claim 10,
wherein said bar code reader further comprises means for generating a first audible confirmation sound each time a push button operation or dial operation of said remote telephone set is performed while said bar code reader is inserted in said inlet opening of said housing, and for generating a second audible confirmation sound upon completion of a predetermined plurality of operations by said remote telephone set;
wherein said electronic equipment generates a third audible confirmation sound upon completion of a remote control input by said bar code reader; and
wherein said local telephone unit further comprises confirmation means for detecting said first and second audible confirmation sounds generated by said bar code reader and said third audible confirmation sound generated by said electronic equipment and for transmitting said confirmation sounds to the user of said remote telephone set as a confirmation signal.

14. A remote control apparatus according to claim 9, wherein said bar code reader and said housing are configured so that said bar code reader must have a predetermined orientation while being inserted into said inlet opening in order for said bar code reader to be held in said inlet opening at said predetermined position and in order for said signal coupling means of said main controller to be optically coupled to said bar code reader.

15. A remote control according to claim 14, wherein said bar code reader comprises a power supply circuit, and a power switch which is pushed by a part of said housing and turns on said power supply circuit only if said bar code reader has said predetermined orientation while being inserted into said inlet opening.

16. A remote control apparatus according to claim 14, wherein said main controller has a power supply circuit, and wherein said local telephone unit comprises a power switch which turns on said power supply circuit of said main controller only if said bar code reader has said predetermined orientation while being inserted into said inlet opening.

17. A remote control apparatus according to claim 14,
wherein said bar code reader further comprises means for generating a first audible confirmation sound each time a push button operation or dial operation of said remote telephone set is performed after said bar code reader has been inserted in said inlet opening while having said predetermined orientation, and a second audible confirmation sound upon completion of a predetermined plurality of operations by said remote telephone set;
wherein said electronic equipment generates a third audible confirmation sound upon completion of a remote control input by said bar code reader; and
wherein said local telephone unit further comprises confirmation means for detecting said first and second audible confirmation sounds generated by said bar code reader and said third audible confirmation sound generated by said electronic equipment and for transmitting said confirmation sounds to the user of said remote telephone set as a confirmation signal.

18. A remote control apparatus according to claim 9, wherein said bar code reader further comprises a power supply circuit, and a power switch which is pushed by a part of said housing and turns on a power supply circuit only when said bar code reader has been inserted into said inlet opening at said predetermined position.

19. A remote control apparatus according to claim 9, wherein said main controller has a power supply circuit, and wherein said local telephone unit comprises a power switch which turns on said power supply circuit of said main controller only when said bar code reader has been inserted into said inlet opening at said predetermined position.

20. A remote control apparatus for an electronic equipment according to claim 9,
wherein said bar code reader further comprises means for generating a first audible confirmation sound each time a push button operation or dial operation of said remote telephone set is performed while said bar code reader is inserted in said inlet opening of said housing, and a second audible confirmation sound upon completion of a predetermined plurality of operations by said remote telephone set;
wherein said electronic equipment generates a third audible confirmation sound upon completion of a remote control input by said bar code reader; and
wherein said local telephone unit further comprises confirmation means for detecting said first and second audible confirmation sounds generated by said bar code reader and said third audible confirmation sound generated by said electronic equipment and for transmitting said confirmation sounds to the user of said remote telephone set as a confirmation signal.

21. A remote control apparatus according to claim 9, wherein said bar code reader optically reads and temporarily stores bar coded program information including at least a predetermined television broadcasting channel, recording date, recording start time and recording end time, and transmits said stored data as a remote control signal to said timer reservation unit in a wireless fashion; and wherein said electronic equipment is a video tape recorder with a timer reservation unit which causes said video tape recorder to start a recording operation at a given date and time in response to said remote control signal from said bar code reader and to stop said recording operation after a given time.

* * * * *